(12) United States Patent
Toyota

(10) Patent No.: US 9,063,337 B2
(45) Date of Patent: Jun. 23, 2015

(54) OPTICAL SCANNING DEVICE, IMAGE FORMING APPARATUS WITH OPTICAL SCANNING DEVICE, AND METHOD FOR ADJUSTING MASS OF OSCILLATING MIRROR PART OF OPTICAL SCANNING DEVICE

(71) Applicant: KYOCERA Document Solutions Inc., Osaka (JP)

(72) Inventor: Yuji Toyota, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 0 days.

(21) Appl. No.: 14/313,807

(22) Filed: Jun. 24, 2014

(65) Prior Publication Data
US 2015/0002595 A1    Jan. 1, 2015

(30) Foreign Application Priority Data
Jun. 27, 2013 (JP) .................................. 2013-135616

(51) Int. Cl.
| G02B 26/10 | (2006.01) |
| G02B 26/08 | (2006.01) |
| G03G 15/04 | (2006.01) |
| B23K 26/36 | (2014.01) |

(52) U.S. Cl.
CPC .............. *G02B 26/105* (2013.01); *G03G 15/04* (2013.01); *B23K 26/36* (2013.01)

(58) Field of Classification Search
CPC ..... G02B 26/10; G02B 26/0833; G02B 26/08
USPC ......................................... 347/256, 259, 260
See application file for complete search history.

(56) References Cited

U.S. PATENT DOCUMENTS

| 2007/0146851 | A1* | 6/2007 | Nakajima ..................... 359/206 |
| 2008/0165403 | A1* | 7/2008 | Grasshoff et al. ............. 359/199 |
| 2009/0224432 | A1* | 9/2009 | Nagatomo et al. ............ 264/400 |
| 2010/0118370 | A1* | 5/2010 | Fujii et al. ................. 359/214.1 |

FOREIGN PATENT DOCUMENTS

| CN | 101784938 A | 7/2010 |
| EP | 2188665 A1 | 5/2010 |
| JP | 2005-091544 A | 4/2005 |
| JP | 2005091544 A * | 4/2005 |
| JP | 2009-075538 A | 4/2009 |
| KR | 2010058592 A | 6/2010 |

* cited by examiner

*Primary Examiner* — Sarah Al Hashimi
(74) *Attorney, Agent, or Firm* — Knobbe, Martens, Olson & Bear LLP

(57) ABSTRACT

An optical scanning device includes an oscillating mirror part, a torsion bar part, a piezoelectric element (driving part), a housing, and an optical element part. The oscillating mirror part includes a reflective surface capable of reflecting light from a first light source and a mass adjustment part formed on an opposite surface of the oscillating mirror part to the reflective surface and configured to be capable of reducing a mass thereof by exposure to laser light. The torsion bar part supports the oscillating mirror part. The piezoelectric element is configured to torsionally oscillate the oscillating mirror part about the torsion bar part. The housing accommodates the oscillating mirror part, the torsion bar part, and the piezoelectric element. The optical element part is configured to reflect or transmit the laser light from a second light source disposed outside of the housing to expose the mass adjustment part to the laser light.

12 Claims, 9 Drawing Sheets

LONGITUDINAL DIRECTION OF HOUSING

OPTICAL SCANNING DEVICE, IMAGE FORMING APPARATUS WITH OPTICAL SCANNING DEVICE, AND METHOD FOR ADJUSTING MASS OF OSCILLATING MIRROR PART OF OPTICAL SCANNING DEVICE

INCORPORATION BY REFERENCE

This application claims priority to Japanese Patent Application No. 2013-135616 filed on Jun. 27, 2013, the entire contents of which are incorporated by reference herein.

BACKGROUND

The present disclosure relates to an optical scanning device, an image forming apparatus with an optical scanning device, and a method for adjusting the mass of an oscillating mirror part of an optical scanning device.

Resonant optical scanning devices are known which include an oscillating mirror part and a torsion bar part supporting the oscillating mirror part. In optical scanning devices of this type, the mass of the oscillating mirror part is often adjusted in order to adjust the resonant frequency. For example, there is known an optical scanning device (a general device A) in which the mass of the oscillating mirror part is adjusted by removing a portion of the back surface of the oscillating mirror part (an opposite surface to a reflective surface thereof) by laser processing.

Furthermore, resonant optical scanning devices include those in which the oscillating mirror part is accommodated in a closed housing in order to prevent contamination of the oscillating mirror part. In relation to this, there is known an optical scanning device (a general device B) in which the mass of the oscillating mirror part is adjusted with the oscillating mirror part accommodated in the housing. This optical scanning device includes a mass adjustment part formed on a surface of the oscillating mirror part and capable of changing the mass by a chemical reaction with a gas and is configured to adjust the mass of the oscillating mirror part by adjusting the amount of the chemical reaction.

SUMMARY

A technique further modified from the above known techniques is proposed as an aspect of the present disclosure.

An optical scanning device according to an aspect of the present disclosure includes an oscillating mirror part, a torsion bar part, a driving part, a housing, and an optical element part.

The oscillating mirror part includes a reflective surface capable of reflecting light emitted from a first light source and a mass adjustment part formed on an opposite surface of the oscillating mirror part to the reflective surface and configured to be capable of reducing a mass thereof by exposure to laser light.

The torsion bar part supports the oscillating mirror part.

The driving part is configured to torsionally oscillate the oscillating mirror part about the torsion bar part.

The housing accommodates the oscillating mirror part, the torsion bar part, and the driving part.

The optical element part is configured to reflect or transmit the laser light emitted from a second light source disposed outside of the housing to expose the mass adjustment part to the laser light.

An image forming apparatus according to another aspect of the present disclosure includes the aforementioned optical scanning device and an image carrier having a surface on which an electrostatic latent image is to be formed by exposure to laser light emitted from the optical scanning device.

Still another aspect of the present disclosure is directed to a method for adjusting a mass of an oscillating mirror part of an optical scanning device including: the oscillating mirror part including a reflective surface capable of reflecting light emitted from a first light source and a mass adjustment part formed on an opposite surface of the oscillating mirror part to the reflective surface and configured to be capable of reducing the mass thereof by exposure to laser light; a torsion bar part supporting the oscillating mirror part; a driving part configured to torsionally oscillate the oscillating mirror part about the torsion bar part; a housing accommodating the oscillating mirror part, the torsion bar part, and the driving part; and an optical element part configured to reflect or transmit the laser light emitted from a second light source disposed outside of the housing to expose the mass adjustment part to the laser light. The method includes a mass adjustment step of reducing the mass of the mass adjustment part by allowing the second light source to emit the laser light and then allowing the optical element part to reflect or transmit the emitted laser light to expose the mass adjustment part to the laser light.

DETAILED DESCRIPTION

Prior to a description of embodiments of the present disclosure, a description will be given of findings that provided the basis on which the inventor has invented an optical scanning device, an image forming apparatus with an optical scanning device, and a method for adjusting a mass of an oscillating mirror part of an optical scanning device, all according to the present disclosure.

The resonant frequency for use in resonating the oscillating mirror part of an optical scanning device varies not only with the mass of the oscillating mirror part and the spring constant of the torsion bar part but also with, for example, the stiffness or other characteristics of a housing accommodating the oscillating mirror part. Therefore, the mass adjustment of the oscillating mirror part (i.e., the resonant frequency adjustment) should preferably be made with the oscillating mirror part accommodated in the housing.

However, in the aforementioned general device A, if the oscillating mirror part is accommodated in a housing, the back surface of the oscillating mirror part cannot be exposed to laser light, resulting in failure to adjust the mass of the oscillating mirror.

A possible solution to this problem is, as in the aforementioned general device B, to form a mass adjustment part capable of chemical reaction with a gas on the surface of the oscillating mirror part. Thus, even with the oscillating mirror accommodated in the housing, the mass of the oscillating mirror part can be adjusted.

In this case, however, a tightly sealed structure for enclosing the gas in the housing is necessary, resulting in increased costs. In addition, it is also necessary to additionally prepare a gas absorbent or an outgassing material as a mass adjustment part and fix it to the surface of the oscillating mirror part. Therefore, the overall structure of the device is complicated, resulting in higher costs.

In view of the foregoing circumstances, the inventor conducted various studies mainly with the aim of achieving easy mass adjustment of the oscillating mirror part accommodated in the housing while providing a simple device structure and has finally invented, as described below, an optical scanning device, an image forming apparatus with an optical scanning device, and a method for adjusting a mass of an oscillating mirror part of an optical scanning device, all according to the present disclosure.

Hereinafter, embodiments of the present disclosure will be described in detail with reference to the drawings. Note that the present disclosure is not at all limited to the following embodiments.

Figure 1:
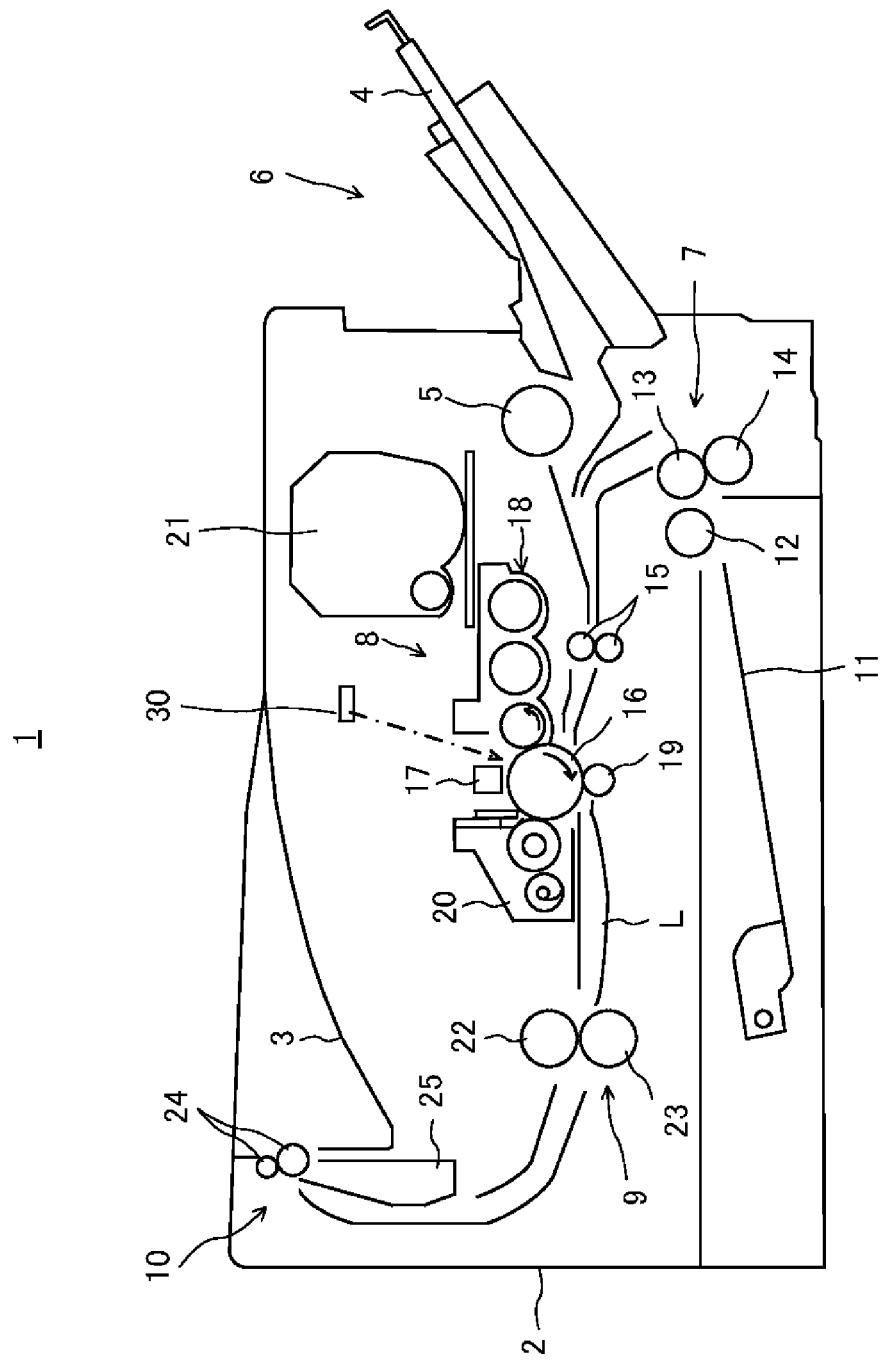
FIG. 1 is a schematic cross-sectional view showing an image forming apparatus with an optical scanning device according to Embodiment 1 of the present disclosure.
Figure 2:
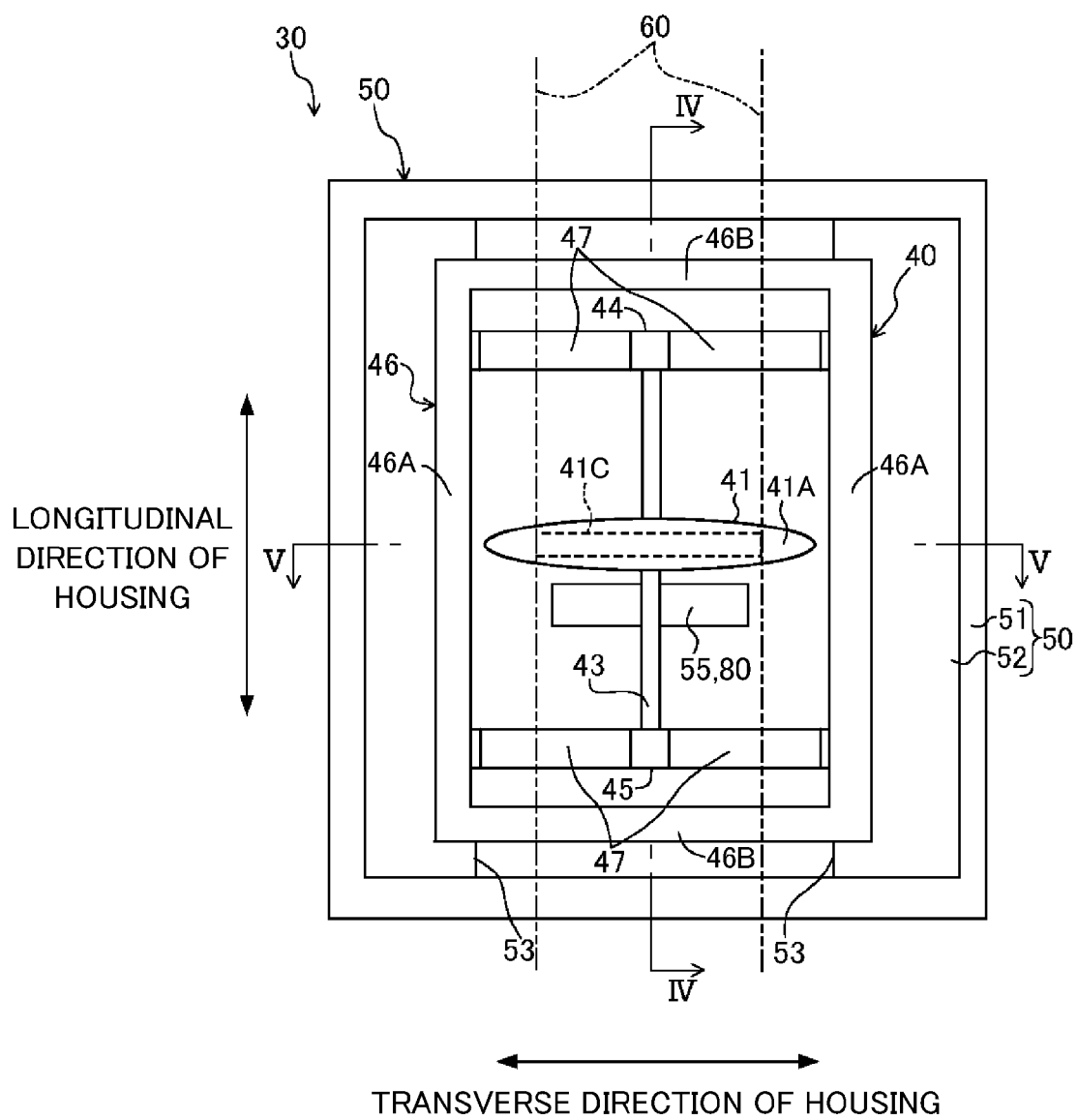
FIG. 2 is a plan view showing the optical scanning device according to Embodiment 1 of the present disclosure when viewed from the front side.

FIG. 1 is a cross-sectional view showing a schematic structure of a laser printer 1 as an image forming apparatus according to this embodiment.

As shown in FIG. 1, the laser printer 1 includes a box-shaped printer body 2, a manual feed section 6, a cassette feed section 7, an image forming section 8, a fixing section 9, and a sheet output section 10. The laser printer 1 is configured to form an image on a paper sheet based on image data transmitted from an unshown terminal or the like while it conveys the paper sheet along a conveyance path L in the printer body 2.

The manual feed section 6 includes: a manual feed tray 4 provided in an openable and closable manner at one lateral side of the printer body 2; and a sheet feed roller 5 for manual feed provided rotatably in the interior of the printer body 2.

The cassette feed section 7 is provided at the bottom of the printer body 2. The cassette feed section 7 includes: a paper feed cassette 11 capable of containing a plurality of paper sheets piled one on another; a pickup roller 12 configured to pick up the paper sheets in the paper feed cassette 11 sheet by sheet; and a pair of a feed roller 13 and a retard roller 14 configured to separate the picked paper sheets one from another and feed them to the conveyance path L.

The image forming section 8 is provided in the interior of the printer body 2 above the cassette feed section 7. The image forming section 8 includes a photosensitive drum 16 provided rotatably in the printer body 2 and serving as an image carrier, an electric charger 17, a development section 18, a transfer roller 19, a cleaning section 20, an optical scanning device 30, and a toner hopper 21. The electric charger 17, the development section 18, the transfer roller 19, and the cleaning section 20 are arranged around the photosensitive drum 16. The optical scanning device 30 and the toner hopper 21 are disposed above the photosensitive drum 16. The image forming section 8 is configured to form an image on a paper sheet fed from the manual feed section 6 or the cassette feed section 7.

In the conveyance path L, a pair of registration rollers 15 are provided to temporarily hold the fed paper sheet and then feed it to the image forming section 8 with a predetermined timing.

The fixing section 9 is disposed laterally of the image forming section 8. The fixing section 9 includes a fixing roller 22 and a pressure rotor 23 which are configured to be rotated by pressing against each other. The fixing section 9 is configured to fix a toner image transferred to the paper sheet by the image forming section 8 on the paper sheet.

The sheet output section 10 is provided above the fixing section 9. The sheet output section 10 includes an output tray 3, a pair of sheet output rollers 24 configured to convey a paper sheet to the output tray 3, and a plurality of conveyance guide ribs 25 configured to guide the paper sheet to the pair of sheet output rollers 24. The output tray 3 is formed as a recess in the top of the printer body 2.

When the laser printer 1 receives image data, the photosensitive drum 16 in the image forming section 8 is driven into rotation and the electric charger 17 in the image forming section 8 electrostatically charges the surface of the photosensitive drum 16.

Then, based on the image data, laser light is emitted from the optical scanning device 30 to the photosensitive drum 16. By the exposure of the photosensitive drum 16 to the laser light, an electrostatic latent image is formed on the surface of the photosensitive drum 16. The electrostatic latent image formed on the photosensitive drum 16 is developed into a visible image as a toner image by the development section 18.

Thereafter, the paper sheet is pressed against the surface of the photosensitive drum 16 by the transfer roller 19. Thus, the toner image on the photosensitive drum 16 is transferred to the paper sheet. The paper sheet having the toner image transferred thereto is subjected to heat and pressure by the fixing roller 23 and the pressure roller 24 in the fixing section 9. As a result, the toner image is fixed on the paper sheet.

As shown in FIGS. 2 to 5, the optical scanning device 30 includes a first light source 31 configured to emit light, an oscillating body 40, and a housing 50 accommodating the oscillating body 40.

The housing 50 is formed in an approximately cuboidal shape when viewed as a whole. The housing 50 has, in plan view, a rectangular shape in which the dimension in the longitudinal direction (the top-to-bottom direction in FIG. 2) is greater than the dimension in the transverse direction (the right-and-left direction in FIG. 2). The housing 50 includes a bottomed housing body 51 in which one side in the height direction (the front side of the paper plane of FIG. 2) is open; and a lid 52 closing the open side of the housing body 51. The housing body 51 is made of, for example, a resin material, while the lid 52 is made of a light-transmissive material, for example, glass. The lid 52 is configured to be capable of transmitting both of light incident from the first light source 31 on an oscillating mirror part 41 to be described hereinafter and light reflected on the oscillating mirror part 41.

Figure 3:
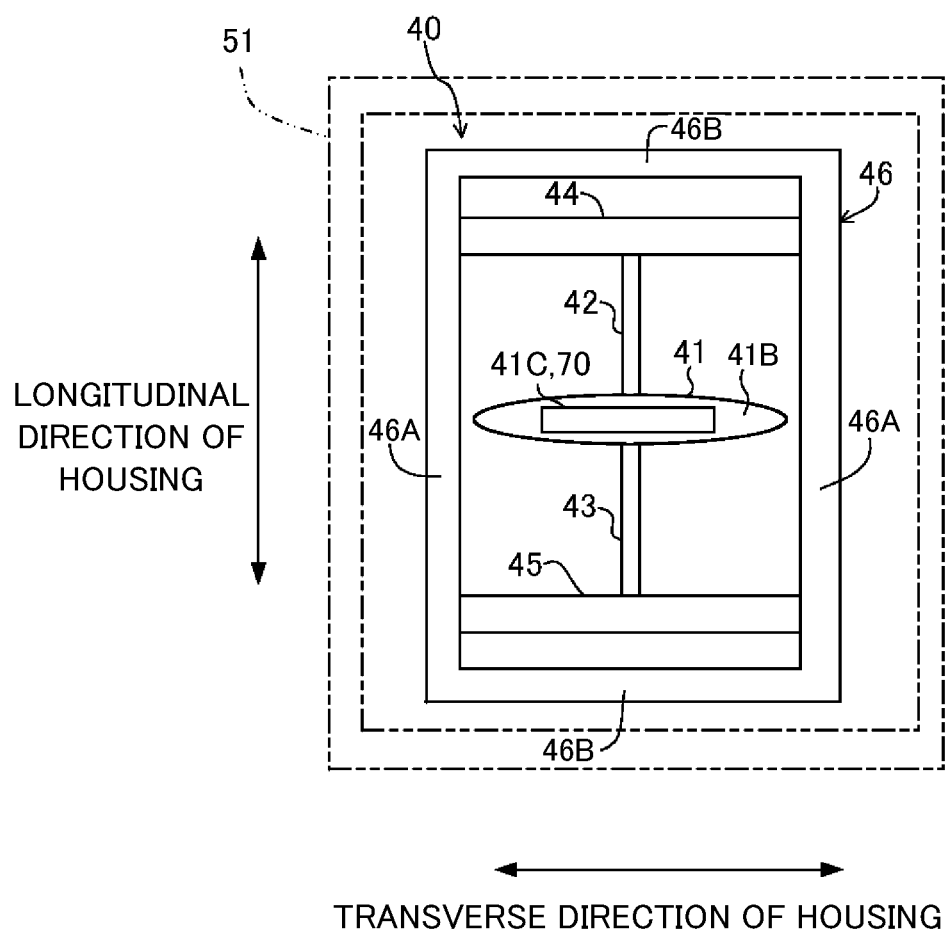
FIG. 3 is a plan view showing the optical scanning device according to Embodiment 1 of the present disclosure when viewed from the back side.
Figure 4:
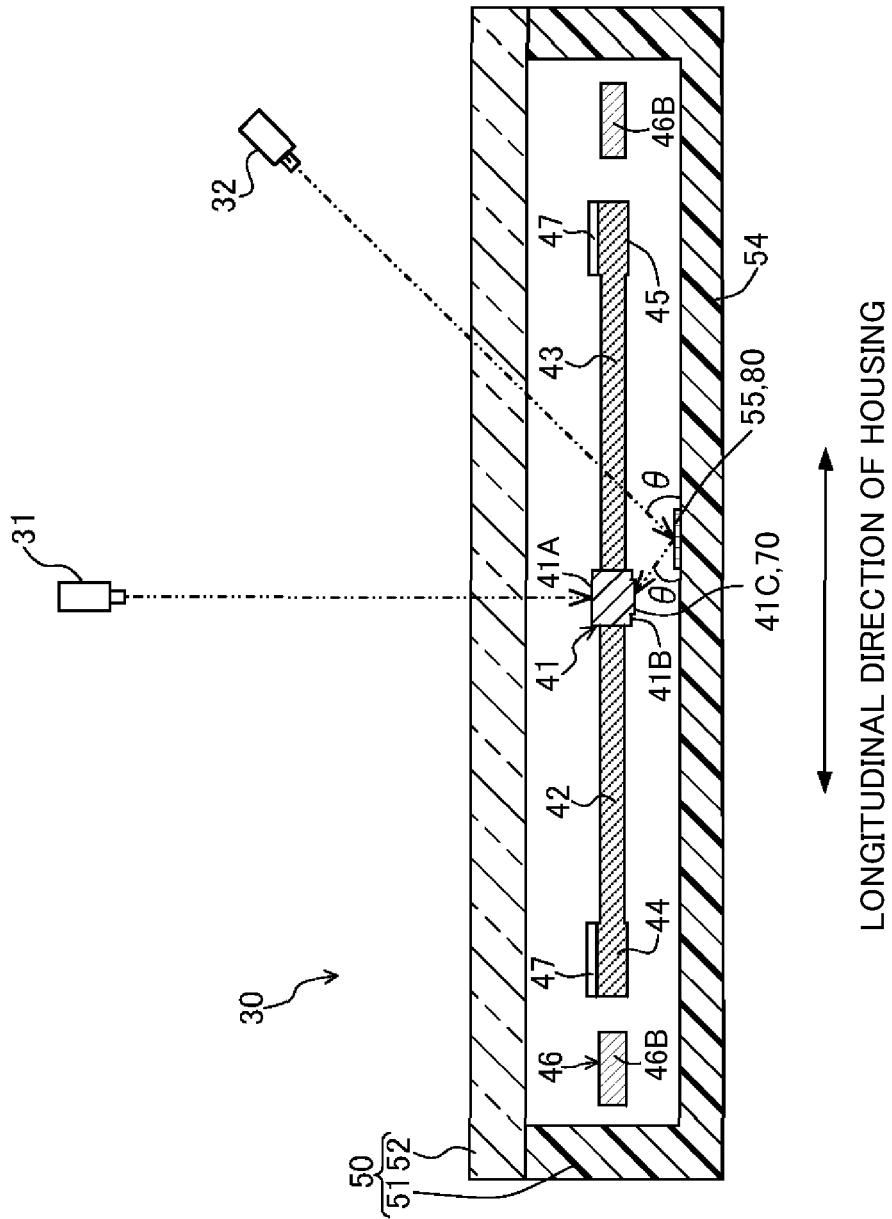
FIG. 4 is a cross-sectional view of the optical scanning device shown in FIG. 2, taken along the line IV-IV.
Figure 5:
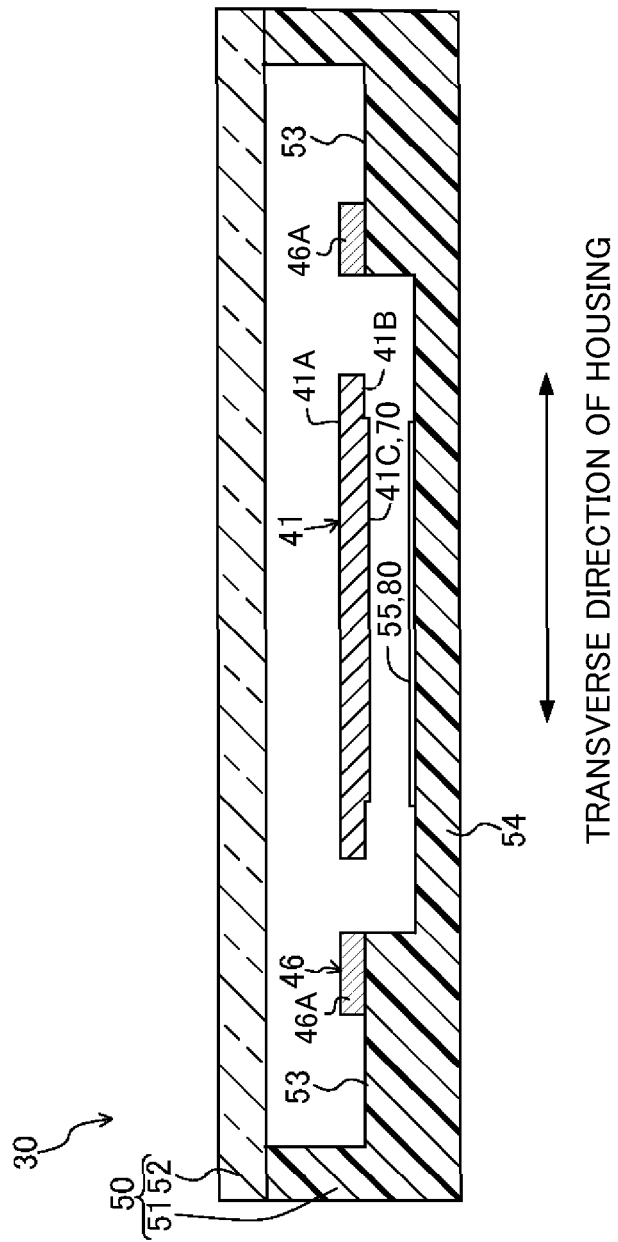
FIG. 5 is a cross-sectional view of the optical scanning device shown in FIG. 2, taken along the line V-V.

The oscillating body 40 is a so-called MEMS (micro-electro-mechanical system) device and is formed by etching a silicon plate. Specifically, the oscillating body 40 includes, as shown in FIG. 3, an oscillating mirror part 41, first and second torsion bar parts 42, 43, first and second transverse beam parts 44, 45, and approximately rectangular plate-shaped fixed frame part 46. The oscillating mirror part 41 is formed in the shape of an approximately elliptic sheet in plan view. The oscillating mirror part 41 is disposed substantially in the center of the fixed frame part 46. The direction of the long diameter of the oscillating mirror part 41 corresponds to the transverse direction of the housing and the direction of the short diameter of the oscillating mirror part 41 corresponds to the longitudinal direction of the housing. One side of the oscillating mirror part 41 in the thickness direction (a surface thereof on the front side of the paper plane of FIG. 2) is formed into a reflective surface 41A for use to reflect light emitted from the first light source 31. Formed on this reflective surface 41A is a light-reflective coating made of, for example, aluminum or chromium, in order to increase the optical reflectivity. The oscillating mirror part 41 is configured to torsionally oscillate about both the torsion bar parts 42, 43 and thus change the reflection direction of light incident from the first light source 31 on the reflective surface 41A, allowing the light to reciprocally scan a target in a predetermined direction.

A cuboidal rib 41C extending in the longitudinal direction of the oscillating mirror part 41 is formed on the opposite surface 41B of the oscillating mirror 41 to the reflective surface 41A (see FIG. 3). The rib 41B is formed on a longitudinally intermediate portion of the opposite surface 41B of the oscillating mirror part 41, i.e., a portion other than both longitudinal end portions thereof. Since in this manner the rib 41C is not formed on both longitudinal end portions of the oscillating mirror part 41, the inertia moment of the oscillating mirror part 41 about the axis of oscillation can be reduced to reduce the deformation of the oscillating mirror part 41 during oscillation. The rib 41C functions not only as a reinforcement for the oscillating mirror part 41 but also as a mass adjustment part 70 for the oscillating mirror 41.

The first and second torsion bar parts 42, 43 have a plate-like shape elongated in the longitudinal direction of the housing. Both the torsion bar parts 42, 43 are disposed on a line passing through the center of the oscillating mirror part 41 in plan view (or on an extended line of the short axis of the ellipse of the oscillating mirror part 41). The first torsion bar part 42 is connected at one end to a midportion of the oscillating mirror part 41 in the direction of the long diameter thereof and connected at the other end to a longitudinal midportion of the first transverse beam part 44. The second torsion bar part 43 is connected at one end to a midportion of the oscillating mirror part 41 in the direction of the long diameter thereof and connected at the other end to a longitudinal midportion of the second transverse beam part 45.

The first and second transverse beam parts 44, 45 are disposed at a distance from each other in the longitudinal direction of the housing. The oscillating mirror part 41 is disposed between both the transverse beam parts 44, 45. Both ends of the first transverse beam part 44 and both ends of the second transverse beam part 45 are connected to the fixed frame part 46. The fixed frame part 46 includes a pair of longitudinal members 46A extending in the longitudinal direction of the housing and a pair of transverse members 46B extending in the transverse direction of the housing. Each of the first and second transverse beam parts 44, 45 is disposed to span both the longitudinal members 46A of the fixed frame part 46. Each of the first and second transverse beam parts 44, 45 is provided with two piezoelectric elements 47 (see FIGS. 2 and 4) attached thereto as driving parts. Each piezoelectric element 47 is electrically connected to an unshown drive circuit. The drive circuit is configured to change the voltage applied to each piezoelectric element 47 with a predetermined frequency and thus expand or contract the piezoelectric element 47 to oscillate it. The frequency of oscillation of the piezoelectric elements 47 are selected to accord with the resonant frequency of the oscillating mirror part 41. This resonant frequency varies with various factors, such as, for example, the mass of the oscillating mirror part 41, the spring constant of the torsion bar parts 42, 43, and the stiffness of the housing 50. When the piezoelectric elements 47 oscillate with the aforementioned resonant frequency, the oscillating mirror part 41 resonates and thus torsionally oscillates about both the torsion bar parts 42, 43.

The fixed frame part 46 is supported by a pair of mounts 53 (see FIG. 5) formed at the interior of the housing body 51. The pair of mounts 53 are composed of shoulders formed at both end portions of the housing interior in the transverse direction of the housing by recessing a midportion of a bottom wall 54 of the housing body 51 in the transverse direction of the housing. This pair of mounts 53 are formed over the entire length of the housing body 51. The fixed frame part 46 is disposed to span the pair of mounts 53.

A reflecting mirror part 55 is formed on a portion of the bottom wall 54 of the housing body 51 located between the pair of mounts 53. The reflecting mirror part 55 is formed of a reflective coating made of, for example, aluminum or chromium. The reflecting mirror part 55 is disposed to be offset from the oscillating mirror part 41 toward one side in the longitudinal direction of the housing in plan view. The reflecting mirror part 55 has a rectangular shape elongated in the transverse direction of the housing in plan view. The longitudinal dimension of the reflecting mirror part 55 is smaller than the longitudinal dimension of the rib 41C. The reflecting mirror part 55 is disposed, in plan view, between two imaginary lines 60 (see FIG. 2) passing through both longitudinal ends of the rib 41C and extending in the longitudinal direction of the housing.

The reflecting mirror part 55 functions as an optical element part 80 configured to, in adjusting the mass of the oscillating mirror part 41, reflect laser light incident from the second light source 32 on the reflecting mirror part 55 and expose the rib 41C (mass adjustment part 70) of the oscillating mirror part 41 to the laser light. By exposure to the laser light, the rib 41C develops an ablation reaction. Through the ablation reaction, the mass of the rib 41C is reduced, so that the mass of the oscillating mirror part 41 is adjusted. The mass adjustment of the oscillating mirror part 41 is made so that the resonant frequency thereof reaches a target frequency.

A specific description will be given below of the procedure for adjusting the mass of the oscillating mirror part 41. First, the housing body 51 is set on an adjustment table so that its open side faces upward (setting step). Next, the oscillating body 40 including the oscillating mirror part 41 is fixed on the mount 53 in the housing body 51 and then the open side of the housing body 51 is closed by the lid 52. After the housing 50 is closed in this manner, laser light is emitted at a predetermined incident angle θ with respect to and toward the reflecting mirror part 55 in the housing 50 by the second light source 32 provided outside of the housing 50. The laser light reflected on the reflecting mirror part 55 is applied to the under surface of the rib 41C of the oscillating mirror part 41 to cause an ablation reaction of the rib 41C (see FIG. 4). By the ablation reaction, part of the mass of the rib 41C is removed. Thus, the mass of the oscillating mirror part 41 is adjusted to a predetermined mass (mass adjustment step).

Figure 6:
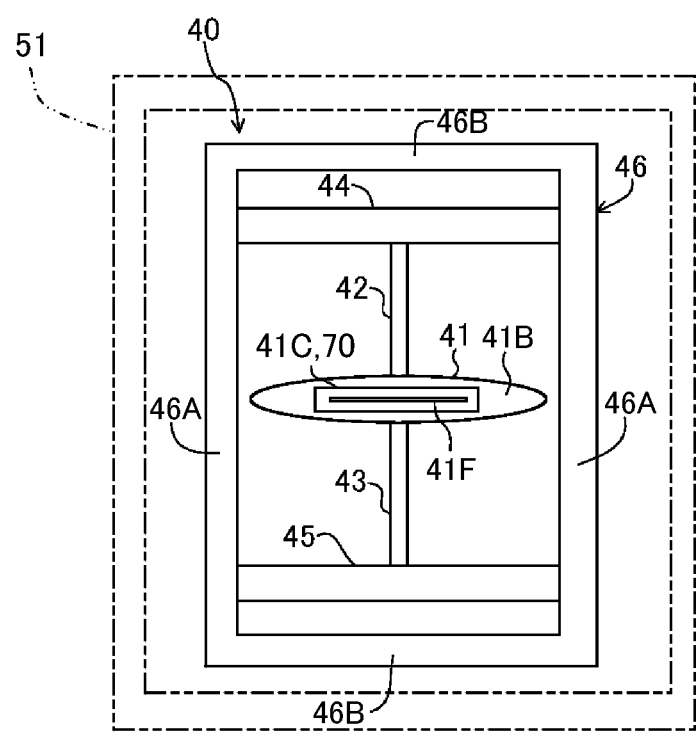
FIG. 6 is a view showing a state of the optical scanning device shown in FIG. 3 after being subjected to mass adjustment.

In this case, since in the above setting step the housing body 51 is set on the adjustment table so that its open side faces upward, the rib 41C is located downwardly of the reflective surface 41A of the oscillating mirror part 41 in the direction of gravitational force. Therefore, the portion of the rib 41C having developed an ablation reaction is scattered around in particles but the scattered particles gravitationally fall down and adhere to the bottom wall 54 of the housing body 51. Thus, the reflective surface 41A of the oscillating mirror part 41 can be prevented from being contaminated by the scattered particles. The laser light is applied linearly along the longitudinal direction of the rib 41C. Therefore, by the ablation reaction, a groove 41F extending in the longitudinal direction of the rib 41C is formed in the under surface of the rib 41C (see FIG. 6). Furthermore, the laser light is applied to avoid that the groove 41F (the portion of the mass adjustment part 70 from which the mass has been removed) reaches the periphery of the rib 41C. Thus, even if the location on the rib 41C exposed to laser light is varied, it can be prevented that the laser light runs off the edges of the rib 41C. This prevents the laser light from damaging the reflective surface 41A of the oscillating mirror part 41 and regions around the reflective surface 41A.

As thus far described, in Embodiment 1, the mass of the oscillating mirror part 41 can be easily adjusted with the oscillating mirror part 41 accommodated in the housing 50. Thus, the resonant frequency of the oscillating mirror part 41 can be adjusted in consideration of the stiffness and other characteristic of the housing 50. In addition, it is not necessary to additionally prepare a gas absorbent or an outgassing material as a mass adjustment part 70 and enhance the sealed structure of the housing 50 for the purpose of enclosing the gas in the housing 50. Therefore, the entire structure of the device 30 can be simplified.

Figure 7:
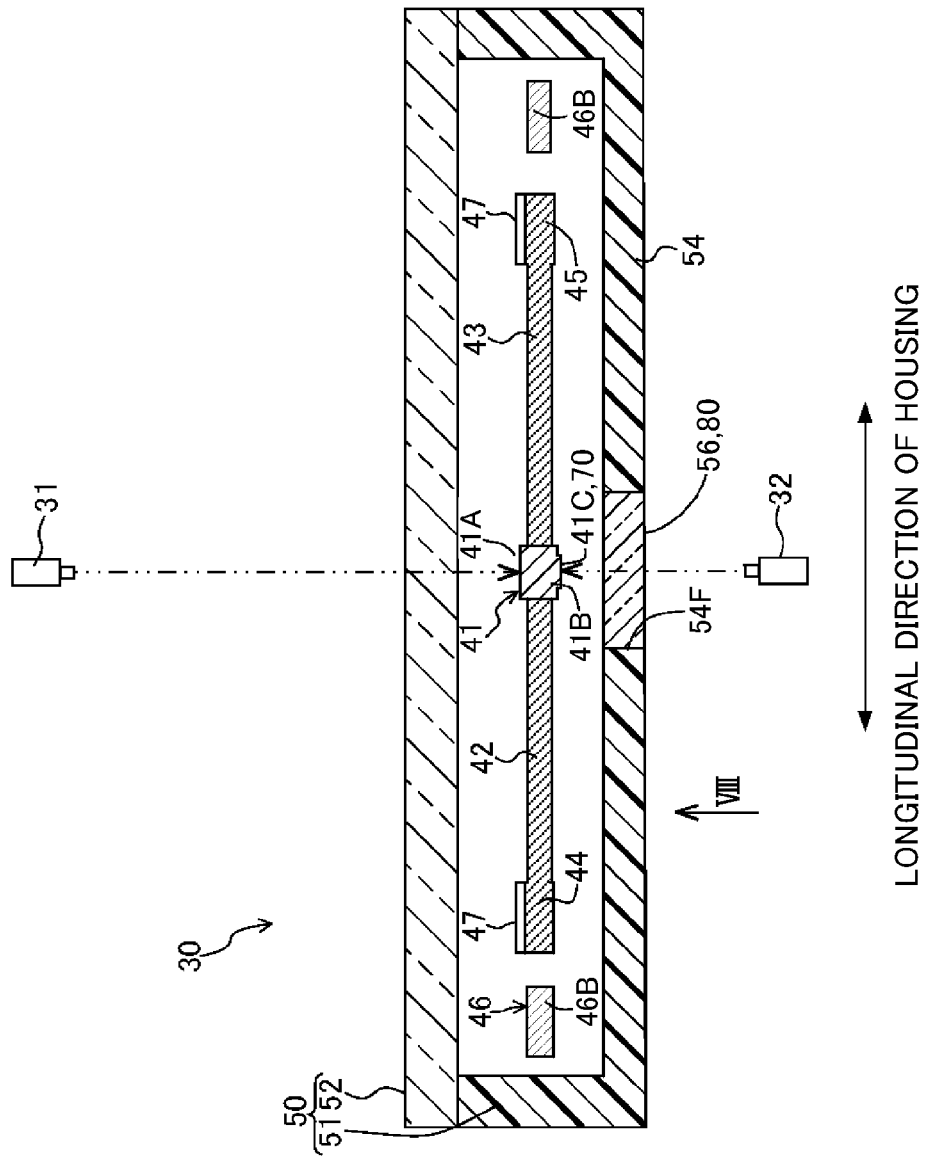
FIG. 7 is a cross-sectional view of an optical scanning device according to Embodiment 2 of the present disclosure, taken along the line IV-IV shown in FIG. 2.
Figure 8:
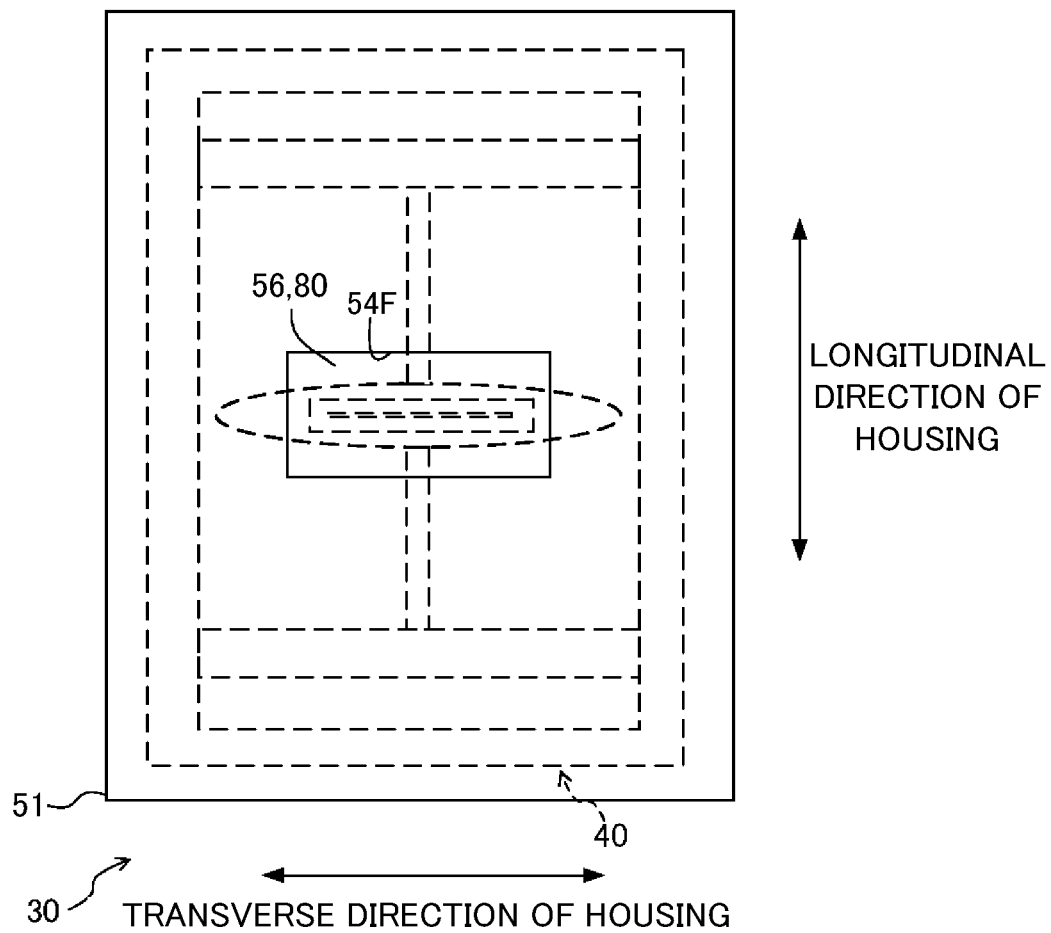
FIG. 8 is a plan view of the optical scanning device according to Embodiment 2 of the present disclosure when viewed from the back side.

FIGS. 7 and 8 show Embodiment 2. Embodiment 2 is different from the above embodiment in terms of the structure of the optical element part 80. In the following description, the same parts are designated by the same reference characters and a detailed explanation thereof will be accordingly omitted.

In Embodiment 2, the optical element part 80 is constituted by a light-transmissive window part 56 capable of transmitting laser light emitted from the second light source 32. The light-transmissive window part 56 is formed by fitting a member capable of transmitting laser light (for example, a glass sheet) into a rectangular opening 54F formed in the bottom wall 54 of the housing 50. The light-transmissive window part 56 is formed just below the oscillating mirror part 41. The laser light emitted from the second light source 32 passes through the light-transmissive window part 56 and is then applied to the under surface of the rib 41C of the oscillating mirror part 41. Thus, the same operations and effects as in Embodiment 1 can be provided.

Figure 9:
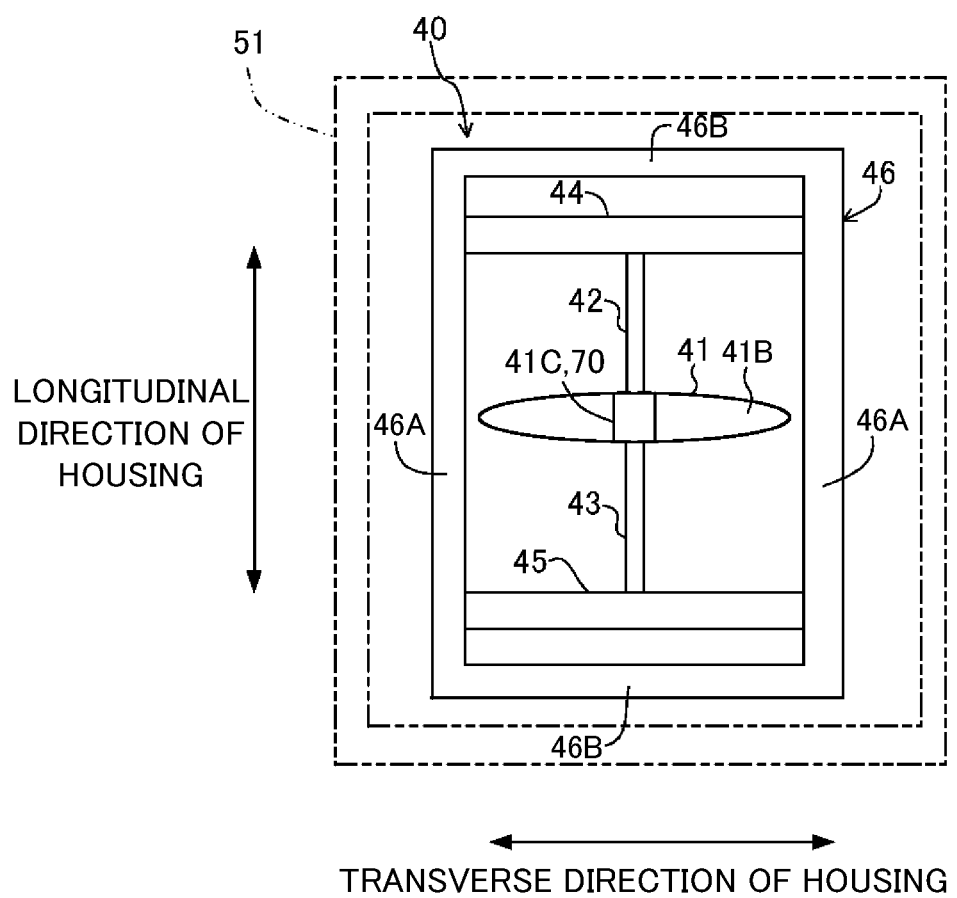
FIG. 9 is a plan view showing an optical scanning device according to another embodiment of the present disclosure when viewed from the back side.

Although in the above embodiment 1 and embodiment 2 the rib 41C is formed to extend in the longitudinal direction of the oscillating mirror part 41, the rib is not limited to this. For example, as shown in FIG. 9, the rib 41C may be formed on the extended line of both the torsion bar parts 42, 43. Thus, the inertia moment of the oscillating mirror part 41 about the axis of oscillation can be reduced to reduce the deformation of the oscillating mirror part 41 due to an inertia force during oscillation.

Although in the above embodiment 1 and embodiment 2 the pressure in the interior of the housing 50 is not adjusted, the present disclosure is not limited to this and, for example, the interior of the housing 50 may be vacuumized. Thus, the air resistance acting on the oscillating mirror part 41 during oscillation can be reduced to stabilize the oscillation characteristics of the oscillating mirror part 41. In this case, after the interior of the housing 50 is vacuumized, the mass of the oscillating mirror part 41 can be adjusted.

Although in the above embodiment 1 and embodiment 2 the rib 41C is formed as the mass adjustment part 70 on the opposite surface 41B of the oscillating mirror part 41 to the reflective surface 41A, the rib 41C is not necessarily required.

For example, the entire opposite surface 41B of the oscillating mirror part 41 may be formed in a flat surface and serve as the mass adjustment part 70. In other words, the mass adjustment part 70 may be of any shape and any material so long as it is configured to be capable of reducing the mass by exposure to laser light.

Although in the above embodiment 1 and embodiment 2 the piezoelectric elements 47 oscillate the oscillating mirror part 41, the manner of oscillation is not limited to this. For example, the oscillating mirror part may be oscillated using an electrostatic drive force as disclosed in JP 2005-91544A or may be driven using an electromagnetic drive force of a magnet.

Although in the above embodiment 1 and embodiment 2 the oscillating mirror part 41 is formed in an elliptic shape in plan view, the shape of the oscillating mirror part is not limited to this. The oscillating mirror part may have any shape, such as rectangular, square or circular.

Although the description in the above embodiment 1 and embodiment 2 has been given of the case where the optical scanning device according to the present disclosure is applied to a printer, the present disclosure is not necessarily limited to this case. The present disclosure may be applied to any optical scanning device, such as a scanner, a projector or a bar-code reader.

As thus far described, the optical scanning device 30 according to one embodiment of the present disclosure includes an oscillating mirror part 41, torsion bar parts 42, 43, piezoelectric elements 47 (driving part), a housing 50, and an optical element part 80. The oscillating mirror part 41 includes a reflective surface 41A capable of reflecting light emitted from a first light source 31 and a mass adjustment part 70 formed on an opposite surface of the oscillating mirror part 41 to the reflective surface 41A and configured to be capable of reducing the mass thereof by exposure to laser light. The torsion bar parts 42, 43 support the oscillating mirror part 41. The piezoelectric elements 47 are configured to torsionally oscillate the oscillating mirror part 41 about the torsion bar parts 42, 43. The housing 50 accommodates the oscillating mirror part 41, the torsion bar parts 42, 43, and the piezoelectric elements 47. The optical element part 80 is configured to reflect or transmit the laser light emitted from a second light source 32 disposed outside of the housing 50 to expose the mass adjustment part 70 to the laser light.

With this configuration, laser light emitted from the second light source 32 disposed outside of the housing 50 is reflected on or transmitted through the optical element part 80, so that the mass adjustment part 70 of the oscillating mirror part 41 is exposed to the laser light. As a result, the mass of a portion of the mass adjustment part 70 exposed to the laser light is removed by an ablation reaction. Therefore, the mass of the oscillating mirror part 41 can be adjusted with the oscillating mirror part 41 accommodated in the housing 50. In addition, it is not necessary to additionally prepare a gas absorbent or an outgassing material as a mass adjustment part 70 and enhance the sealed structure of the housing 50 for the purpose of enclosing the gas in the housing 50. Therefore, the entire structure of the device can be simplified.

Furthermore, in the optical scanning device 30 according to one embodiment of the present disclosure, the optical element part 80 is constituted by a reflecting mirror part 55 provided in the interior of the housing 50 and configured to reflect laser light emitted from the second light source 32.

With this configuration, laser light emitted from the second light source 32 is reflected on the reflecting mirror part 55, so that the mass adjustment part 70 of the oscillating mirror part 41 is exposed to the laser light. By employing the reflecting mirror part 55 as the optical element part 80 in this manner, laser light emitted from the second light source 32, even if space constraints exist, can be guided to the back surface of the oscillating mirror part 41 (the opposite side to the reflective surface 41A) to expose the mass adjustment part 70 to the laser light.

Alternatively, in the optical scanning device 30 according to one embodiment of the present disclosure, the optical element part 80 is constituted by a light-transmissive window part 56 formed in a wall 54 of the housing 50 and configured to transmit laser light emitted from the second light source 32.

With this configuration, laser light emitted from the second light source 32 passes through the light-transmissive window part 56 formed in the wall 54 of the housing 50, so that the mass adjustment part 70 of the oscillating mirror part 41 is exposed to the laser light. By employing the light-transmissive window part 56 as the optical element part 80 in this manner, laser light emitted from the second light source 32 can be easily guided to the back surface of the oscillating mirror part 41 to expose the mass adjustment part 70 to the laser light.

Furthermore, in the optical scanning device 30 according to one embodiment of the present disclosure, a rib 41C is formed on the opposite surface of the oscillating mirror part 41 to the reflective surface 41A and the mass adjustment part 70 is constituted by the rib 41C.

With this configuration, the rib 41C for reinforcement formed on the oscillating mirror part 41 is used also as the mass adjustment part 70, so that the mass of the oscillating mirror part 41 can be easily adjusted while the deformation of the oscillating mirror part 41 due to an inertia force during oscillation can be reduced.

Moreover, the laser printer (image forming apparatus) 1 according to one embodiment of the present disclosure includes the aforementioned optical scanning device 30.

With this configuration, by employing the above optical scanning device 30, the mass (resonant frequency) of the oscillating mirror part 41 can be adjusted in consideration of the stiffness and other characteristics of the housing 50. Thus, the light scanning characteristics of the optical scanning device 30 can be increased. As a result, the quality of printed image can be increased.

The method for adjusting the mass of the oscillating mirror part 41 of the optical scanning device 30 according to one embodiment of the present disclosure includes a mass adjustment step of reducing the mass of the mass adjustment part 70 by allowing the second light source 32 of the optical scanning device 30 to emit laser light and then allowing the optical element part 80 to reflect or transmit the emitted laser light to expose the mass adjustment part 70 to the laser light.

With this method, the mass of the oscillating mirror part 41 accommodated in the housing 50 can be easily adjusted while a simple device structure can be provided.

Furthermore, in the method for adjusting the mass of the oscillating mirror part 41 of the optical scanning device 30 according to one embodiment of the present disclosure, the mass adjustment step is the step of exposing the mass adjustment part 70 to the laser light to avoid that when the oscillating mirror part 41 is viewed from a side opposite to the reflective surface 41A, a portion of the mass adjustment part 70 from which mass has been removed reaches a periphery of the mass adjustment part 70.

With this method, even if the location on the mass adjustment part 70 of the oscillating mirror part 41 exposed to the laser light is varied, it can be prevented that the laser light runs off the edges of the mass adjustment part 70. This prevents the laser light emitted from the second light source 32 from damaging the reflective surface 41A of the oscillating mirror part 41 and regions around the reflective surface 41A.

Moreover, the method for adjusting the mass of the oscillating mirror part 41 of the optical scanning device 30 according to one embodiment of the present disclosure further includes a setting step of, prior to the mass adjustment step, setting the optical scanning device 30 so that the mass adjustment part 70 is located downwardly of the reflective surface 41A of the oscillating mirror part 41 in the direction of gravitational force.

With this method, the portion of the rib 41C having developed an ablation reaction is scattered around in particles but the scattered particles gravitationally fall down and adhere to the bottom wall 54 of the housing body 51. Therefore, the reflective surface 41A of the oscillating mirror part 41 can be prevented from being contaminated by the scattered particles.

Various modifications and alterations of this disclosure will be apparent to those skilled in the art without departing from the scope and spirit of this disclosure, and it should be understood that this disclosure is not limited to the illustrative embodiments set forth herein.

What is claimed is:

1. An optical scanning device comprising:
   an oscillating mirror part including a reflective surface capable of reflecting light emitted from a first light source and a mass adjustment part formed on an opposite surface of the oscillating mirror part to the reflective surface and configured to be capable of reducing a mass thereof by exposure to laser light;
   a torsion bar part supporting the oscillating mirror part;
   a driving part configured to torsionally oscillate the oscillating mirror part about the torsion bar part;
   a housing accommodating the oscillating mirror part, the torsion bar part, and the driving part; and
   a reflecting mirror part provided in an interior of the housing and configured to reflect laser light emitted from a second light source disposed outside of the housing to expose the mass adjustment part to the laser light.

2. An optical scanning device comprising:
   an oscillating mirror part including a reflective surface capable of reflecting light emitted from a first light source and a mass adjustment part formed on an opposite surface of the oscillating mirror part to the reflective surface and configured to be capable of reducing a mass thereof by exposure to laser light;
   a torsion bar part supporting the oscillating mirror part;
   a driving part configured to torsionally oscillate the oscillating mirror part about the torsion bar part;
   a housing accommodating the oscillating mirror part, the torsion bar part, and the driving part; and
   a light-transmissive window part formed in a wall of the housing and configured to transmit laser light emitted from a second light source disposed outside of the housing to expose the mass adjustment part to the laser light.

3. An optical scanning device comprising:
   an oscillating mirror part including a reflective surface capable of reflecting light emitted from a first light source and a mass adjustment part formed on an opposite surface of the oscillating mirror part to the reflective surface and configured to be capable of reducing a mass thereof by exposure to laser light;
   a torsion bar part supporting the oscillating mirror part;
   a driving part configured to torsionally oscillate the oscillating mirror part about the torsion bar part;
   a housing accommodating the oscillating mirror part, the torsion bar part, and the driving part; and an optical element part configured to reflect or transmit the laser light emitted from a second light source disposed outside of the housing to expose the mass adjustment part to the laser light, wherein a rib is formed on the opposite surface of the oscillating mirror part to the reflective surface, and the mass adjustment part is constituted by the rib.

4. A method for adjusting a mass of an oscillating mirror part of an optical scanning device comprising:

an accommodation step of accommodating within a housing (i) the oscillating mirror part including a reflective surface capable of reflecting light emitted from a first light source and a mass adjustment part formed on an opposite surface of the oscillating mirror part to the reflective surface and configured to be capable of reducing the mass thereof by exposure to laser light, (ii) a torsion bar part supporting the oscillating mirror part, (iii) a driving part configured to torsionally oscillate the oscillating mirror part about the torsion bar part, and (iv) a reflecting mirror part; and a mass adjustment step of reducing the mass of the mass adjustment part by allowing a second light source disposed outside of the housing to emit the laser light and then allowing the reflecting mirror part to reflect the emitted laser light to expose the mass adjustment part to the laser light.

5. The method for adjusting a mass of an oscillating mirror part of an optical scanning device according to claim 4, wherein the mass adjustment step is the step of exposing the mass adjustment part to the laser light so that when the oscillating mirror part is viewed from a side opposite to the reflective surface, a groove of the mass adjustment part from which mass has been removed does not reach a periphery of the mass adjustment part.

6. The method for adjusting a mass of an oscillating mirror part of an optical scanning device according to claim 4, further comprising a setting step of, prior to the mass adjustment step, setting the optical scanning device so that the mass adjustment part is located downwardly of the reflective surface of the oscillating mirror part in a direction of gravitational force.

7. A method for adjusting a mass of an oscillating mirror part of an optical scanning device comprising:

an accommodation step of accommodating within a housing (i) the oscillating mirror part including a reflective surface capable of reflecting light emitted from a first light source and a mass adjustment part formed on an opposite surface of the oscillating mirror part to the reflective surface and configured to be capable of reducing the mass thereof by exposure to laser light, (ii) a torsion bar part supporting the oscillating mirror part, and (iii) a driving part configured to torsionally oscillate the oscillating mirror part about the torsion bar part; and a mass adjustment step of reducing the mass of the mass adjustment part by allowing a second light source to emit the laser light and then allowing a light-transmissive window part formed in a wall of the housing to transmit the emitted laser light to expose the mass adjustment part to the laser light.

8. The method for adjusting a mass of an oscillating mirror part of an optical scanning device according to claim 7, wherein the mass adjustment step is the step of exposing the mass adjustment part to the laser light so that when the oscillating mirror part is viewed from a side opposite to the reflective surface, a groove of the mass adjustment part from which mass has been removed does not reach a periphery of the mass adjustment part.

9. The method for adjusting a mass of an oscillating mirror part of an optical scanning device according to claim 7, further comprising a setting step of, prior to the mass adjustment step, setting the optical scanning device so that the mass adjustment part is located downwardly of the reflective surface of the oscillating mirror part in a direction of gravitational force.

10. An image forming apparatus comprising:
the optical scanning device according to claim 1; and
an image carrier having a surface on which an electrostatic latent image is to be formed.

11. An image forming apparatus comprising:
the optical scanning device according to claim 2; and
an image carrier having a surface on which an electrostatic latent image is to be formed.

12. An image forming apparatus comprising:
the optical scanning device according to claim 3; and
an image carrier having a surface on which an electrostatic latent image is to be formed.

* * * * *